United States Patent
Yang (10) Patent No.: US 12,035,351 B2
(45) Date of Patent: Jul. 9, 2024

(54) DATA PROCESSING METHOD AND DEVICE USING TRANSMISSION PRIORITIES

(71) Applicant: VIVO MOBILE COMMUNICATION CO., LTD., Guangdong (CN)

(72) Inventor: Xiaodong Yang, Chang'an Dongguan (CN)

(73) Assignee: VIVO MOBILE COMMUNICATION CO.,LTD., Guangdong (CN)

( * ) Notice: Subject to any disclaimer, the term of this patent is extended or adjusted under 35 U.S.C. 154(b) by 542 days.

(21) Appl. No.: 17/244,784

(22) Filed: Apr. 29, 2021

(65) Prior Publication Data

US 2021/0250960 A1    Aug. 12, 2021

Related U.S. Application Data

(63) Continuation of application No. PCT/CN2019/113688, filed on Oct. 28, 2019.

(30) Foreign Application Priority Data

Oct. 31, 2018 (CN) .................. 201811290190.X (51) Int. Cl.
*H04W 72/56* (2023.01)
*H04W 52/28* (2009.01)
(Continued)

(52) U.S. Cl.
CPC ......... *H04W 72/56* (2023.01); *H04W 52/281* (2013.01); *H04W 72/0453* (2013.01);
(Continued)

(58) Field of Classification Search
CPC ..... H04W 72/04; H04W 72/10; H04W 92/00; H04W 92/16; H04W 92/18; H04W 52/06;
(Continued)

(56) References Cited

U.S. PATENT DOCUMENTS

2016/0007400 A1    1/2016    Agiwal et al.
2016/0337839 A1    11/2016   Chae
(Continued)

FOREIGN PATENT DOCUMENTS

CA    3038634 A1 *    9/2019    ............ H04W 52/04
CN    105940742 A       9/2016
(Continued)

OTHER PUBLICATIONS

Chinese Office Action dated May 26, 2022 as received in application No. 201811290190.X.
(Continued)

*Primary Examiner* — Warner Wong
(74) *Attorney, Agent, or Firm* — Price Heneveld LLP (57) ABSTRACT

Embodiments of the present invention disclose a data processing method and a device, and relate to the field of communication technologies, so as to resolve a problem that UE cannot transmit a plurality of pieces of data simultaneously, resulting in collision between the plurality of pieces of data. A specific solution is determining first transmission priorities of at least two pieces of data, where time-domain resources used for transmitting the at least two pieces of data overlap; and determining a target processing manner based on the first transmission priorities, where the target processing manner is used to process the at least two pieces of data. The embodiments of the present invention are applied to a process in which the UE determines the target processing manner for processing the at least two pieces of data in a sidelink transmission process.

16 Claims, 3 Drawing Sheets

(51) Int. Cl.
   *H04W 72/0453* (2023.01)
   *H04W 28/18* (2009.01)
   *H04W 74/08* (2009.01)
   *H04W 92/18* (2009.01)

(52) U.S. Cl.
   CPC ........ *H04W 28/18* (2013.01); *H04W 74/0875* (2013.01); *H04W 92/18* (2013.01)

(58) Field of Classification Search
   CPC . H04W 52/28; H04W 52/281; H04W 72/044; H04W 72/0466; H04W 72/0453; H04W 72/50; H04W 72/56; H04W 74/02; H04W 74/0875; H04W 28/00; H04W 28/02; H04W 28/0231; H04W 28/0236; H04W 28/0268; H04W 28/0875; H04W 28/18; H04W 72/40
   See application file for complete search history.

(56) References Cited

U.S. PATENT DOCUMENTS

| | | | |
|---|---|---|---|
| 2017/0027013 A1* | 1/2017 | Kim | H04W 52/383 |
| 2017/0230939 A1* | 8/2017 | Rudolf | H04L 67/104 |
| 2017/0230993 A1 | 8/2017 | Lee et al. | |
| 2017/0303215 A1* | 10/2017 | Kim | H04W 52/48 |
| 2018/0049220 A1* | 2/2018 | Patil | H04W 72/27 |
| 2018/0092112 A1 | 3/2018 | Jung et al. | |
| 2018/0139769 A1 | 5/2018 | Lee et al. | |
| 2018/0295639 A1* | 10/2018 | Bhushan | H04W 72/535 |
| 2019/0253977 A1 | 8/2019 | Wang | |
| 2020/0127800 A1* | 4/2020 | Tang | H04W 72/23 |
| 2020/0213984 A1 | 7/2020 | Hwang et al. | |
| 2020/0404684 A1 | 12/2020 | Lee et al. | |

FOREIGN PATENT DOCUMENTS

| | | |
|---|---|---|
| CN | 106664715 A | 5/2017 |
| CN | 106797644 A | 5/2017 |
| CN | 107645710 A | 1/2018 |
| CN | 107889157 A | 4/2018 |
| CN | 108702768 A | 10/2018 |
| WO | 2017171528 A1 | 10/2017 |
| WO | 2017179915 A2 | 10/2017 |
| WO | 2018143689 A1 | 8/2018 |
| WO | 2018143722 A1 | 8/2018 |

OTHER PUBLICATIONS

Vivo, "Remaining issues on UL data transmission for URLLC" 3GPP TSG RAN WG1 Meeting #92bis, R1-1806070, May 21, 2018.
Vivo, "UL inter-UE Tx prioritization for URLLC" 3GPP TSG RAN WG1 Meeting #94bis R1-1810396, Oct. 8, 2018.
Kalaivani et al, "An Efficient Clustering Algorithm for Spatially Correlated Sensor Network" IEEE 2015.
Niu T, Zhang D M, Xu K. et al. Video distortion reduction with instantly decodable network coding and Device-to-Device communications (in Chinese). Sci Sin Inform, 2018, 48: 205{220, doi: 10.1360/N112016-00264.
Zhao et al, "Time-Efficient Scheduling for Multi-path Routing in WSNs" Jun. 2018.
Japanese Office Action dated May 30, 2022 as recieved in application No. 2021-523622.
Intel Corp, "Sidelink Synchronization Enhancements for Wearable and IoT Use Cases" 3GPP TSG RAN WG1 Meeting#90 R1-1712514, Aug. 21, 2017.
Intel Corp, "Physical Layer Aspects of Sidelink Carrier Aggregation for Mode-4 LTE V2V Communication" 3GPP TSG RAN WG1 Meeting #91 R1-1720031, Nov. 27, 2017.
LG Electronics, "Summary of Mode 4 CA" 3GPP TSG RAN WG1 Meeting #92bis R1-1805393, Apr. 16, 2018.
CATT "Coexistence of NR sidelink and LTE sidelink in V2X" 3GPP TSG RAN WG1 Meeting #94 R1-1808407, Aug. 20, 2018.
Samsung, "Discussion on Coexistence between LTE and NR PC5" 3GPP TSG RAN WG1 Meeting #94bis R1-1810875, Oct. 8, 2018.
OPPO, "Discussion of sidelink unicast, groupcast and broadcast for NR-V2X" 3GPP TSG RAN WG1 Meeting #94bis R1-1810984, Oct. 8, 2018.
CATT, "Consideration on Uu MAC due to V2X transmission" 3GPP TSG-RAN WG2 Meeting #103bis R2-1813730, Oct. 8, 2018.
LG Electronics Inc., "De-prioritization of duplicated transmission for V2X sidelink communication" 3GPP TSG-RAN WG2 #103bis R2-1815431, Oct. 8, 2018.
Japanese Office Action dated Oct. 3, 2022 as received in application No. 2021-523622.
"Priority handling for D2D communications" 3GPP TSG-RAN WG1 Meeting #81 R1-153374 May 2015, InterDigital Communications.
"Discussion on resource allocation mechanism for NR sidelink" 3GPP TSG RAN WG1 Meeting #94bis, R1-1810953 Oct. 2018 Panasonic.
International Search Report and Written Opinion dated Dec. 30, 2019 as received in application No. PCT/CN2019/113688.
Chinese Office Action dated Jun. 22, 2021 as received in application No. 201811290190.X.
"Discussion on UL power control for NR CA case" 3GPP TSG RAN WG1 Meeting 91, R1-1719945, Reno, USA, Nov. 27-Dec. 1, 2017, LG Electronics.
"Discussion on remaining issues for SUL and EN-DC", 3GPP TSG RAN WG1 Meeting #92bis, R1-1803656, Sanya, China, Apr. 16-20, 2018, Huawei.
European Search Report dated Dec. 2, 2021 as received in application No. 19879657.5.

* cited by examiner

DATA PROCESSING METHOD AND DEVICE USING TRANSMISSION PRIORITIES

This application is a continuation of PCT Application No. PCT/CN2019/113688 filed on Oct. 28, 2019, which claims priority to Chinese Patent Application No. 201811290190.X, filed with China National Intellectual Property Administration on Oct. 31, 2018 and entitled "DATA PROCESSING METHOD AND DEVICE", which are incorporated herein by reference in their entireties.

TECHNICAL FIELD

Embodiments of the present invention relate to the field of communications technologies, and in particular, to a data processing method and a device.

BACKGROUND

A long term evolution (LTE) system supports sidelink transmission, that is, data transmission between user equipments (UE) may be performed directly without a network device.

Currently, the UE may need to transmit a plurality of pieces of data simultaneously in a sidelink transmission process. Before the UE transmits the plurality of pieces of data, the UE may determine related information (for example, a transmission resource or a transmission mode) for transmitting the plurality of pieces of data. Therefore, when the same transmission resource (for example, transmission time) is used for the plurality of pieces of data, the UE may be unable to transmit the plurality of pieces of data simultaneously based on the related information of the plurality of pieces of data due to a limited processing capacity of the UE, resulting in collision between the plurality of pieces of data.

SUMMARY

Embodiments of the present invention provide a data processing method and a device, so as to resolve a problem that UE cannot transmit a plurality of pieces of data simultaneously, resulting in collision between the plurality of pieces of data.

To resolve the foregoing technical problem, the embodiments of the present invention use the following technical solutions:

A first aspect of the embodiments of the present invention provides a data processing method, applicable to a sidelink transmission process. The data processing method may include: determining first transmission priorities of at least two pieces of data, where time-domain resources used for transmitting the at least two pieces of data overlap; and determining a target processing manner based on the first transmission priorities, where the target processing manner is used to process the at least two pieces of data.

A second aspect of the embodiments of the present invention provides UE, applicable to a sidelink transmission process, and the UE may include a determining unit. The determining unit is configured to determine first transmission priorities of at least two pieces of data, where time-domain resources used for transmitting the at least two pieces of data overlap; and determine a target processing manner based on the first transmission priorities, where the target processing manner is used to process the at least two pieces of data.

A third aspect of the embodiments of the present invention provides UE. The UE includes a processor, a memory, and a computer program stored on the memory and capable of running on the processor. When the computer program is executed by the processor, the steps of the data processing method according to the first aspect are implemented.

A fourth aspect of the embodiments of the present invention provides a computer-readable storage medium. A computer program is stored in the computer-readable storage medium, and when the computer program is executed by a processor, the steps of the data processing method according to the first aspect are implemented.

In the embodiments of the present invention, the UE may determine the first transmission priorities of the at least two pieces of data (the time-domain resources used for transmitting the at least two pieces of data overlap), and determine the target processing manner based on the first transmission priorities (the target processing manner is used to process the at least two pieces of data). In the sidelink transmission process, when the at least two pieces of data collide, the UE may first determine the first transmission priorities of the at least two pieces of data, and then determine, based on the first transmission priorities, the target processing manner for processing the at least two pieces of data, so that the UE can process the at least two pieces of data based on the determined target processing manner. This avoids the problem that the at least two pieces of data collide because the UE cannot transmit the at least two pieces of data simultaneously, thereby improving transmission performance of the UE.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In this specification and claims of the embodiments of the present invention, the terms such as "first" and "second" are intended to distinguish between similar objects, but not to necessarily describe a specific order of the objects. For example, a first transmission priority and a second transmission priority are used to distinguish between different transmission priorities, but not to describe a specific order of the transmission priorities. In the description of the embodiments of the present invention, unless otherwise specified, the meaning of "plurality" means two or more than two.

The term "and/or" in this specification describes an association relationship for describing associated objects and represents that three relationships may exist. For example, A and/or B may represent the following three cases: A alone, both A and B, and B alone. The symbol "/" in this specification indicates that the associated objects are in an "or" relationship, for example, A/B means A or B.

In the embodiments of the present invention, the terms "an example" or "for example" are used to represent an example, an illustration, or a description. Any embodiment or design scheme described as "an example" or "for example" in the embodiments of the present invention should not be construed as being more preferred or advantageous than other embodiments or design schemes. To be precise, the use of terms such as "an example" or "for example" is intended to present a related concept in a specific manner.

The following describes some concepts and/or terms included in the data processing method and a device provided in the embodiments of the present invention.

A secondary link/sublink/sidelink is a link through which data transmission is performed between UEs, that is, data transmission between the UEs may not be directly performed through a network device (for example, data transmission may be directly performed at a physical layer).

For example, the UE may transmit sidelink control information (SCI) through a physical sidelink control channel (PSCCH), and may transmit data by scheduling transmission of a physical sidelink shared channel (PSSCH).

Currently, sidelink transmission may be divided into transmission modes such as broadcast, multicast, and unicast. A communications interface between the UEs may be referred to as a PC5 interface, and a communications interface between the UE and an access network device may be referred to as a Uu interface.

A process in which information is transmitted between the UE and another UE through a sidelink is referred to as sidelink communication, and the sidelink communication may include device-to-device (D2D) communication, vehicle-to-everything (V2X) communication, and the like. V2X mainly includes vehicle-to-vehicle communication (V2V), vehicle-to-infrastructure communication (V2I), vehicle-to-network communication (V2N), and vehicle-to-pedestrian communication (V2P).

A proximity-based service per-packet priority (PPPP) may be divided into a maximum of eight groups, with values of 0 to 7. A smaller value of PPPP indicates a higher transmission priority of a data packet, and one data packet may correspond to one or more PPPPs.

Quality of service (QOS) is a security mechanism of a network, and is used to resolve problems of delay and congestion of the network, so as to provide a better service capability for network communication. QoS may include parameters such as a transmission bandwidth, a transmission delay, and a packet loss rate.

The embodiments of the present invention provide a data processing method and a device. UE may determine first transmission priorities of at least two pieces of data (time-domain resources used for transmitting the at least two pieces of data overlap), and determine a target processing manner based on the first transmission priorities (the target processing manner is used to process the at least two pieces of data). In the sidelink transmission process, when the at least two pieces of data collide, the UE may first determine the first transmission priorities of the at least two pieces of data, and then determine, based on the first transmission priorities, the target processing manner for processing the at least two pieces of data, so that the UE can process the at least two pieces of data based on the determined target processing manner. This avoids a problem that the at least two pieces of data collide because the UE cannot transmit the at least two pieces of data simultaneously, thereby improving transmission performance of the UE.

The data processing method and the device provided in the embodiments of the present invention can be applied to a communications system, specifically applied to the process in which the UE determines the target processing manner for processing the at least two pieces of data in the sidelink transmission process.

Optionally, in the embodiments of the present invention, the communications system may be a sidelink communications system.

Figure 1:
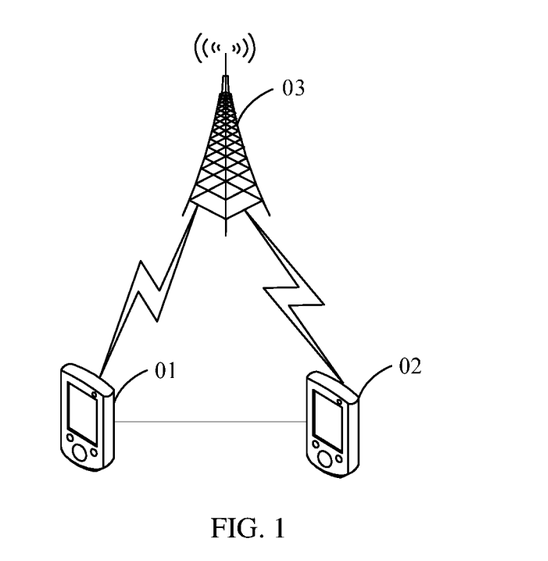
FIG. 1 is a schematic architectural diagram of a communications system according to an embodiment of the present invention.

For example, FIG. 1 is a schematic architectural diagram of a communications system according to an embodiment of the present invention. As shown in FIG. 1, the communications system may include UE 01, UE 02, and an access network device 03. The UE 01 may establish a connection to and communicate with the access network device 03, and the UE 02 may establish a connection to and communicate with the access network device 03. The UE 01 may also establish a connection to and communicate with the UE 02. It should be noted that the communication between the UE 01 and the UE 02 may be referred to as sidelink communication.

It should be noted that in this embodiment of the present invention, the UE 01 and UE 02 shown in FIG. 1 may be wirelessly connected. For clearer illustration of a connection relationship between the UE 01 and the UE 02, the connection relationship between the UE 01 and the UE 02 is denoted by using a solid line in FIG. 1.

The UE is a device that provides a user with voice and/or data connectivity, a handheld device with a wired/wireless connection function, or another processing device connected to a wireless modem. The UE may communicate with one or more core network devices through a radio access network (RAN). The UE may be a mobile terminal such as a mobile phone (or referred to as "cellular" phone) and a computer having a mobile terminal, such as a portable, pocket-sized, handheld, computer built-in, or in-vehicle mobile apparatus, which exchanges voice and/or data with the RAN; or may be a device such as a personal communication service (PCS) phone, a cordless phone, a session initiation protocol (SIP) phone, a wireless local loop (WLL) station, or a personal digital assistant (PDA). The UE may alternatively be referred to as a user agent, a terminal device, or the like.

The access network device may be a base station. The base station is an apparatus deployed in the RAN and configured to provide a wireless communication function for the UE. The base station may include various forms of macro base stations, micro base stations, relay stations, access points, and the like. In systems using different radio access technologies, devices having a base station function may have different names, for example, are referred to as a base station (Node B) in a third generation mobile communications (3G) network, referred to as an evolved NodeB (eNB or eNodeB) in an LTE system, referred to as a gNB in a fifth generation mobile communication (5G) network, and the like. With evolution of the communications technologies, the name "base station" may change.

The following describes in detail a data processing method and a device provided in the embodiments of the present invention by using specific embodiments and application scenarios thereof with reference to the accompanying drawings.

Figure 2:
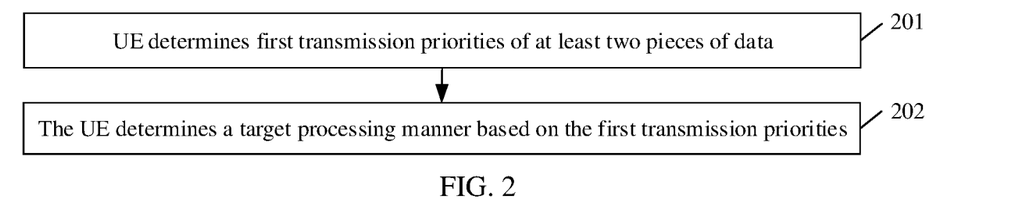
FIG. 2 is a schematic diagram 1 of a data processing method according to an embodiment of the present invention.

Based on the communications system shown in FIG. 1, an embodiment of the present invention provides a data processing method, which may be applied to a sidelink transmission process. As shown in FIG. 2, the data processing method may include the following steps 201 and 202.

Step 201: UE determines first transmission priorities of at least two pieces of data.

Time-domain resources used for transmitting the at least two pieces of data overlap.

It can be understood that in this embodiment of the present invention, in a sidelink transmission process between the UE and another UE, the UE may determine the first transmission priorities of the at least two pieces of data in a case in which the at least two pieces of data collide (for example, the time-domain resources used for transmitting the at least two pieces of data are all the same or partially the same).

Optionally, in this embodiment of the present invention, a possible implementation is that the at least two pieces of data may include at least one piece of sidelink feedback data and at least one piece of other data. The sidelink feedback data is feedback data transmitted between the UE and another UE through a sidelink. Other data may include at least one of the following: service data and control information.

Optionally, in this embodiment of the present invention, the sidelink feedback data may be sidelink feedback information (for example, sidelink acknowledgement (ACK) information or sidelink channel state information (CSI)).

Optionally, in this embodiment of the present invention, the service data may include at least one of the following: service data transmitted between the UE and another UE through a sidelink and Uu interface service data transmitted between the UE and an access network device. The Uu interface service data in this embodiment of the present invention is service data transmitted between the UE and the access network device through the Uu interface.

Optionally, in this embodiment of the present invention, the control information may be Uu interface control information transmitted between the UE and the access network device. The Uu interface control information in this embodiment of the present invention is control information transmitted between the UE and the access network device through the Uu interface.

Optionally, in this embodiment of the present invention, the at least two pieces of data may include at least one piece of sidelink feedback information and at least one piece of Uu interface service data.

Optionally, in this embodiment of the present invention, the Uu interface service data may be specifically Uu interface uplink service data transmitted by the UE to the access network device.

Optionally, in this embodiment of the present invention, another possible implementation is that the at least two pieces of data may include at least two pieces of other data.

Optionally, in this embodiment of the present invention, the first transmission priority may be predefined, or configured by a network device.

Optionally, in this embodiment of the present invention, the first transmission priorities may be target priorities, and the target priorities may include any one of the following: priorities of physical channels carrying the at least two pieces of data, priorities of data channels carrying the at least two pieces of data, priorities of transmission modes used for transmitting the at least two pieces of data, priorities of resource selection modes used for transmitting the at least two pieces of data, and priorities of radio access technology (RAT) types used for transmitting the at least two pieces of data.

It can be understood that in this embodiment of the present invention, the UE may determine the first transmission priorities of the at least two pieces of data to be the priorities of the physical channels carrying the at least two pieces of data; or the UE may determine the first transmission priorities of the at least two pieces of data to be the priorities of the data channels carrying the at least two pieces of data; or the UE may determine the first transmission priorities of the at least two pieces of data to be the priorities of the transmission modes used for transmitting the at least two pieces of data; or the UE may determine the first transmission priorities of the at least two pieces of data to be the priorities of the resource selection modes used for transmitting the at least two pieces of data; or the UE may determine the first transmission priorities of the at least two pieces of data to be the priorities of the RAT types used for transmitting the at least two pieces of data.

Optionally, in this embodiment of the present invention, the transmission modes may include broadcast, multicast, unicast, and the like.

Optionally, in this embodiment of the present invention, the resource selection mode may include a scheduled resource allocation mode and an autonomous resource selection mode. In the scheduled resource allocation mode (for example, mode 1), the network device controls to allocate a sidelink resource to the UE, and in the autonomous resource selection mode (for example, mode 2), the UE autonomously selects a sidelink resource.

Optionally, in this embodiment of the present invention, the RAT type may include a new radio (NR) type and an LTE type.

Optionally, in this embodiment of the present invention, the priority of the physical channel may be a predefined physical channel priority, a physical channel priority configured by the network device, or a priority of a data channel corresponding to the physical channel.

Optionally, in this embodiment of the present invention, the priority of the data channel may be a predefined data channel priority or a data channel priority configured by the network device.

Optionally, in this embodiment of the present invention, a priority of a physical channel carrying Uu interface data (Uu interface data of high QoS) is higher than a priority of a physical channel carrying sidelink feedback information, the priority of the physical channel carrying the sidelink feedback information is higher than a priority of a physical channel carrying uplink data (uplink data of high QoS) between the UE and another UE, and the priority of the physical channel carrying the uplink data between the UE and the another UE is higher than a priority of a physical channel carrying Uu interface data (Uu interface data of low QoS).

It can be understood that the Uu interface data described in this embodiment of the present invention may include at least one of Uu interface service data and Uu interface control information. For specific descriptions of the Uu interface service data and the Uu interface control information, refer to the foregoing related description in this embodiment, and details are not described herein again.

It should be noted that a transmission priority of high-QoS data (for example, data with relatively high security) is higher than that of low-QoS data (for example, data with relatively low security).

It should be noted that for a method for determining high QoS and low QoS, reference may be made to a related method in the prior art, and details are not described herein.

Optionally, in this embodiment of the present invention, a priority of a data channel carrying Uu interface data (Uu interface data of high QoS) is higher than a priority of a data channel carrying sidelink feedback information, the priority of the data channel carrying the sidelink feedback information is higher than a priority of a data channel carrying uplink data (uplink data of high QoS) between the UE and another UE, and the priority of the data channel carrying the uplink data between the UE and the another UE is higher than a priority of a data channel carrying Uu interface data (Uu interface data of low QoS).

Optionally, in this embodiment of the present invention, a priority of a transport block (TB) carrying Uu interface data (Uu interface data of high QoS) is higher than a priority of a TB carrying sidelink feedback information, the priority of the TB carrying the sidelink feedback information is higher than a priority of a TB carrying uplink data (uplink data of high QoS) between the UE and another UE, and the priority of the TB carrying the uplink data between the UE and the another UE is higher than a priority of a TB carrying Uu interface data (Uu interface data of low QoS).

Optionally, in this embodiment of the present invention, a priority of broadcast used for transmitting the at least two pieces of data is higher than a priority of multicast used for transmitting at least two pieces of data, and the priority of the multicast used for transmitting the at least two pieces of data is higher than a priority of unicast used for transmitting the at least two pieces of data.

Optionally, in this embodiment of the present invention, a priority of the scheduled resource allocation mode (for example, mode 1) used for transmitting the at least two pieces of data is higher than a priority of the autonomous resource selection mode (for example, mode 2) used for transmitting the at least two pieces of data.

Optionally, in this embodiment of the present invention, a priority of the LTE type used for transmitting the at least two pieces of data is higher than a priority of the NR type used for transmitting the at least two pieces of data.

Optionally, in this embodiment of the present invention, the at least two pieces of data include feedback information. A priority of a physical channel carrying the feedback information may be a predefined physical channel priority, a physical channel priority configured by a network device, a priority of a data channel corresponding to the physical channel carrying the feedback information, a highest priority in at least two pieces of service data corresponding to the feedback information, or a redefined priority corresponding to the at least two pieces of service data.

It can be understood that in this embodiment of the present invention, the UE may determine a priority of each of the at least two pieces of service data corresponding to the feedback information, and determine a priority of highest-priority data in the at least two pieces of service data as the priority of the physical channel carrying the feedback information.

It can be understood that in this embodiment of the present invention, the UE may redefine one priority for the at least two pieces of service data corresponding to the feedback information, and determine the one redefined priority as the priority of the physical channel carrying the feedback information.

Optionally, in this embodiment of the present invention, the feedback information may be the sidelink feedback information described above in this embodiment, that is, the feedback information between the UE and another UE. The physical channel carrying the feedback information may be a dedicated feedback channel.

Optionally, in this embodiment of the present invention, the at least two pieces of service data corresponding to the feedback information may be uplink service data or a reference signal (RS) transmitted by another UE and received by the UE.

For example, it is assumed that the at least two pieces of service data corresponding to the feedback information are data 1 and data 2. If the UE determines that a priority of the data 1 is higher than a priority of the data 2, the UE may determine the priority of the data 1 as the priority of the physical channel carrying the feedback information. Alternatively, if the priority of the data 1 determined by the UE is a and the priority of the data 2 is b, the UE may redefine both the priority of the data 1 and the priority of the data 2 as c, and then the UE may determine the priority c as the priority of the physical channel carrying the feedback information.

Optionally, in this embodiment of the present invention, the at least two pieces of data include feedback information. A priority of a data channel carrying the feedback information may be a predefined data channel priority, a data channel priority configured by the network device, a highest priority in at least two pieces of service data corresponding to the feedback information, or a redefined priority corresponding to the at least two pieces of service data (the at least two pieces of service data are at least two pieces of service data corresponding to the feedback information).

Step 202: The UE determines a target processing manner based on the first transmission priorities.

In this embodiment of the present invention, the target processing manner is used to process the at least two pieces of data.

Optionally, in this embodiment of the present invention, the target processing manner may include any one of the following: transmitting data whose first transmission priority is greater than or equal to a preset priority in the at least two pieces of data, and discarding other data; transmitting a preset quantity of pieces of data in the at least two pieces of data and discarding other data; maintaining transmit power of data whose first transmission priority is greater than or equal to a preset priority in the at least two pieces of data, and reducing transmit power of other data; and maintaining transmit power of a preset quantity of pieces of data in the at least two pieces of data, and reducing transmit power of other data.

It should be noted that in this embodiment of the present invention, the target processing manner includes transmitting the data whose first transmission priority is greater than or equal to the preset priority in the at least two pieces of data, where the other data is data other than the data whose first transmission priority is greater than or equal to the preset priority in the at least two pieces of data; the target processing manner includes transmitting the preset quantity of pieces of data in the at least two pieces of data, where the other data is data other than the preset quantity of pieces of data in the at least two pieces of data; the target processing manner includes maintaining the transmit power of the data whose first transmission priority is greater than or equal to the preset priority in the at least two pieces of data, where the other data is data other than the data whose first transmission priority is greater than or equal to the preset priority in the at least two pieces of data; or the target processing manner includes maintaining the transmit power of the preset quantity of pieces of data in the at least two pieces of data, where the other data is data other than the preset quantity of pieces of data in the at least two pieces of data.

Optionally, in this embodiment of the present invention, the target processing manner may be transmitting data of a highest first transmission priority in the at least two pieces of data, and discarding other data.

For example, it is assumed that the at least two pieces of data are feedback information and Uu interface data. After the UE receives data 6 transmitted by another UE, the UE may transmit feedback information corresponding to the data 6 to the another UE. In this case, if the UE needs to transmit the feedback information to the another UE and transmit the Uu interface data to the access network device simultaneously (that is, the feedback information that needs to be transmitted by the UE to the another UE and the Uu interface data to be transmitted to the access network device overlap in time domain), the UE may first determine a priority of a physical channel carrying the feedback information and a priority of a physical channel carrying the Uu interface data. In a case in which the priority of the physical channel carrying the feedback information is higher than the priority of the physical channel carrying the Uu interface data, the UE may transmit the feedback information to the another UE through the physical channel carrying the feedback information, and discard the Uu interface data (that is, does not transmit the Uu interface data to the access network device).

Optionally, in this embodiment of the present invention, the target processing manner may be maintaining transmit power of the data of the highest first transmission priority in the at least two pieces of data, and reducing transmit power of other data.

For example, it is assumed that the at least two pieces of data are feedback information and Uu interface data. After the UE receives data 7 transmitted by another UE, the UE may transmit feedback information corresponding to the data 7 to the another UE. In this case, if the UE needs to transmit the feedback information to the another UE and transmit the Uu interface data to the access network device simultaneously (that is, the feedback information that needs to be transmitted by the UE to the another UE and the Uu interface data to be transmitted to the access network device overlap in time domain), the UE may first determine a priority of a physical channel carrying the feedback information and a priority of a physical channel carrying the Uu interface data. In a case in which the priority of the physical channel carrying the feedback information is higher than the priority of the physical channel carrying the Uu interface data, the UE may maintain transmit power of the feedback information corresponding to the data 7 and reduce transmit power of the Uu interface data.

It can be understood that in this embodiment of the present invention, the preset quantity of pieces of data in the at least two pieces of data may be understood as data corresponding to the preset quantity of consecutive first transmission priorities starting from the 1st first transmission priority.

For example, it is assumed that the at least two pieces of data are data 1 to data 5, first transmission priorities corresponding to the data 1 to the data 5 are a to e respectively, and a to e are ranked sequentially, and the preset quantity is 3. The preset quantity of pieces of data in the at least two pieces of data is data 1 to data 3 corresponding to a to c, respectively (that is, data corresponding to three consecutive first transmission priorities starting from a).

Optionally, in this embodiment of the present invention, the UE may maintain the transmit power of the data whose first transmission priority is greater than or equal to the preset priority in the at least two pieces of data, and reduce the transmit power of other data to a first transmit power. A sum of the first transmit power and the transmit power of the data whose first transmission priority is greater than or equal to the preset priority falls within a first preset power range (for example, a maximum power of the UE).

Optionally, in this embodiment of the present invention, the UE may maintain transmit power of the preset quantity of data in the at least two pieces of data and reduce the transmit power of other data to a second transmit power. A sum of the second transmit power and the transmit power of the preset quantity of data falls within a second preset power range (for example, a maximum power of the UE).

Optionally, in this embodiment of the present invention, the transmitting the data whose first transmission priority is greater than or equal to the preset priority in the at least two pieces of data, and discarding other data may include any one of the following: transmitting the data whose first transmission priority is greater than or equal to the preset priority in the at least two pieces of data, and not transmitting other data; receiving the data whose first transmission priority is greater than or equal to the preset priority in the at least two pieces of data, and not receiving other data; transmitting the data whose first transmission priority is greater than or equal to the preset priority in the at least two pieces of data, and not receiving other data; and receiving the data whose first transmission priority is greater than or equal to the preset priority in the at least two pieces of data, and not transmitting other data.

Optionally, in this embodiment of the present invention, transmitting the preset quantity of pieces of data in the at least two pieces of data and discarding other data may include any one of the following: transmitting the preset quantity of pieces of data in the at least two pieces of data and not transmitting other data; receiving the preset quantity of pieces of data in the at least two pieces of data and not receiving other data; transmitting the preset quantity of pieces of data in the at least two pieces of data and not receiving other data; and receiving the preset quantity of pieces of data in the at least two pieces of data and not transmitting other data.

Optionally, in this embodiment of the present invention, maintaining the transmit power of the data whose first transmission priority is greater than or equal to the preset priority in the at least two pieces of data, and reducing the transmit power of other data may include any one of the following: maintaining the transmit power of the data whose first transmission priority is greater than or equal to the preset priority in the at least two pieces of data, and reducing the transmit power of other data; maintaining a receive power of the data whose first transmission priority is greater than or equal to the preset priority in the at least two pieces of data, and reducing a receive power of other data; maintaining the transmit power of the data whose first transmission priority is greater than or equal to the preset priority in the at least two pieces of data, and reducing the receive power of other data; and maintaining the receive power of the data whose first transmission priority is greater than or equal to the preset priority in the at least two pieces of data, and reducing the transmit power of other data.

Optionally, in this embodiment of the present invention, maintaining the transmit power of the preset quantity of data in the at least two pieces of data, and reducing the transmit power of other data may include any one of the following: maintaining the transmit power of the preset quantity of data in the at least two pieces of data, and reducing the transmit power of other data; maintaining receive powers of the preset quantity of data in the at least two pieces of data, and reducing a receive power of other data; maintaining the transmit power of the preset quantity of data in the at least two pieces of data, and reducing the receive power of other data; and maintaining the receive powers of the preset quantity of data in the at least two pieces of data, and reducing the transmit power of other data.

It can be understood that in this embodiment of the present invention, in a half-duplex transmission mode, that is, in a case in which collision occurs during transmitting and receiving of the at least two pieces of data by the UE (for example, the UE needs to simultaneously transmit the feedback information and receive the Uu interface data), the UE may also determine the target processing manner of the at least two pieces of data based on the first transmission priorities of the at least two pieces of data. For example, if a first transmission priority of the feedback information is higher than a first transmission priority of the Uu interface data, the UE may transmit the feedback information and does not receive the Uu interface data. Alternatively, the UE may transmit the feedback information by using an original transmit power and reduce a receive power for receiving the Uu interface data.

Optionally, in this embodiment of the present invention, a process of transmitting the feedback information by the UE to another UE may include: The UE may first transmit the feedback information to the access network device, and then the access network device transmits the feedback information to the another UE; or the UE may transmit the feedback information directly to the another UE, so that the another UE transmits the feedback information to the access network device after receiving the feedback information.

According to a data processing method provided in this embodiment of the present invention, the UE may determine the first transmission priorities of the at least two pieces of data (time-domain resources used for transmitting the at least two pieces of data overlap), and determine the target processing manner (the target processing manner is used to process the at least two pieces of data) based on the first transmission priorities. In the sidelink transmission process, when the at least two pieces of data collide, the UE may first determine the first transmission priorities of the at least two pieces of data, and then determine, based on the first transmission priorities, the target processing manner for processing the at least two pieces of data, so that the UE can process the at least two pieces of data based on the determined target processing manner. This avoids a problem that the at least two pieces of data collide because the UE cannot transmit the at least two pieces of data simultaneously, thereby improving transmission performance of the UE.

Figure 3:
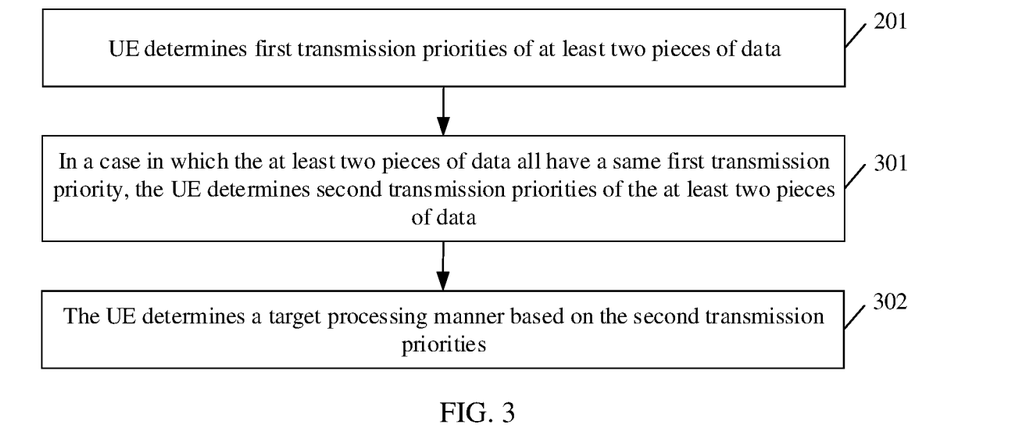
FIG. 3 is a schematic diagram 2 of a data processing method according to an embodiment of the present invention.

Optionally, in this embodiment of the present invention, with reference to FIG. 2, as shown in FIG. 3, the data processing method provided in this embodiment of the present invention may further include the following step 301 after the foregoing step 201, and the foregoing step 202 may be replaced with the following step 302.

Step 301: In a case in which the at least two pieces of data all have a same first transmission priority, the UE determines second transmission priorities of the at least two pieces of data.

The at least two pieces of data have a different second transmission priority.

It can be understood that in this embodiment of the present invention, the second transmission priority is different from the first transmission priority.

It can be understood that in this embodiment of the present invention, if the at least two pieces of data all have the same first transmission priority, the UE may determine second transmission priorities of the at least two pieces of data.

Optionally, in this embodiment of the present invention, the second transmission priorities may include any one of the following: priorities of physical channels carrying the at least two pieces of data, priorities of data channels carrying the at least two pieces of data, priorities of transmission modes used for transmitting the at least two pieces of data, priorities of resource selection modes used for transmitting the at least two pieces of data, and priorities of RAT types used for transmitting the at least two pieces of data.

Optionally, in this embodiment of the present invention, if priorities of physical channels carrying the at least two pieces of data are all the same, the second transmission priorities may include any one of the following: priorities of data channels carrying the at least two pieces of data, priorities of transmission modes used for transmitting the at least two pieces of data, priorities of resource selection modes used for transmitting the at least two pieces of data, and priorities of RAT types used for transmitting the at least two pieces of data.

Optionally, in this embodiment of the present invention, if priorities of data channels carrying the at least two pieces of data are all the same, the second transmission priorities may include any one of the following: priorities of physical channels carrying the at least two pieces of data, priorities of transmission modes used for transmitting the at least two pieces of data, priorities of resource selection modes used for transmitting the at least two pieces of data, and priorities of RAT types used for transmitting the at least two pieces of data.

Optionally, in this embodiment of the present invention, if priorities of transmission modes used for transmitting the at least two pieces of data are all the same, the second transmission priorities may include any one of the following: priorities of physical channels carrying the at least two pieces of data, priorities of data channels carrying the at least two pieces of data, priorities of resource selection modes used for transmitting the at least two pieces of data, and priorities of RAT types used for transmitting the at least two pieces of data.

Optionally, in this embodiment of the present invention, if priorities of resource selection modes used for transmitting the at least two pieces of data are all the same, the second transmission priorities may include any one of the following: priorities of physical channels carrying the at least two pieces of data, priorities of data channels carrying the at least two pieces of data, priorities of transmission modes used for transmitting the at least two pieces of data, and priorities of RAT types used for transmitting the at least two pieces of data.

Optionally, in this embodiment of the present invention, if priorities of RAT types used for transmitting the at least two pieces of data are all the same, the second transmission priorities may include any one of the following: priorities of physical channels carrying the at least two pieces of data, priorities of data channels carrying the at least two pieces of data, priorities of transmission modes used for transmitting the at least two pieces of data, and priorities of resource selection modes used for transmitting the at least two pieces of data.

For example, if all the transmission modes used for transmitting the at least two pieces of data are broadcast, all the priorities of the transmission modes used for transmitting the at least two pieces of data are the same, so that the UE may determine the second transmission priorities of the at least two pieces of data to be the priorities of the physical channels carrying the at least two pieces of data.

Step 302: The UE determines the target processing manner based on the second transmission priorities.

It should be noted that a method for determining the target processing manner by the UE based on the second transmission priorities is similar to a method for determining the target processing manner by the UE based on the first transmission priorities, reference may be made to the specific description of step 202 in the foregoing embodiment, and details are not described herein.

In this embodiment of the present invention, in the case in which the at least two pieces of data all have a same first transmission priority, the UE may determine the target processing manner based on the determined second transmission priorities of the at least two pieces of data, so as to avoid a collision problem between the at least two pieces of data, thereby improving transmission performance of the UE.

Figure 4:
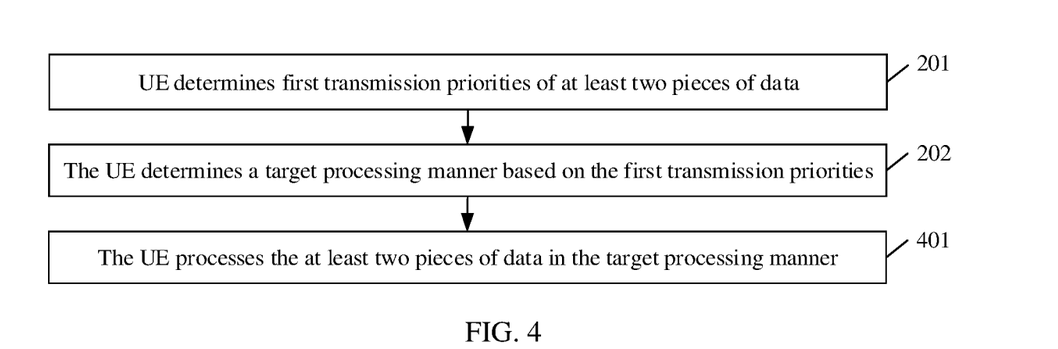
FIG. 4 is a schematic diagram 3 of a data processing method according to an embodiment of the present invention.

Optionally, in this embodiment of the present invention, with reference to FIG. 2, as shown in FIG. 4, the data processing method provided in this embodiment of the present invention may further include the following step 401 after the foregoing step 202.

Step 401: The UE processes the at least two pieces of data in the target processing manner.

It should be noted that for a specific method for processing the at least two pieces of data by the UE in the target processing manner, reference may be made to the description of step 202 in the foregoing embodiment, and details are not described herein again.

In this embodiment of the present invention, the UE may process the at least two pieces of data in the target processing manner that is determined based on the first transmission priorities of the at least two pieces of data. This avoids a problem that the at least two pieces of data collide because the UE cannot transmit the at least two pieces of data simultaneously, thereby improving transmission performance of the UE.

Figure 5:
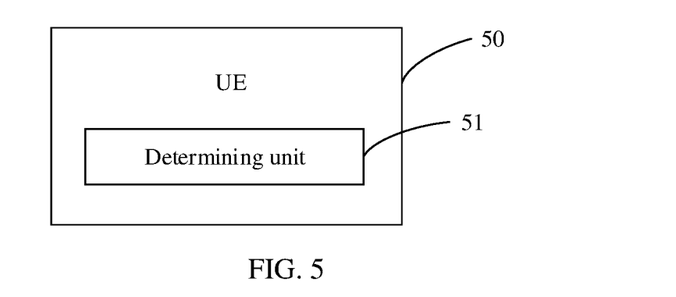
FIG. 5 is a schematic structural diagram 1 of UE according to an embodiment of the present invention.

FIG. 5 is a possible schematic structural diagram of UE according to an embodiment of the present invention, and the UE may be applied to a sidelink transmission process. As shown in FIG. 5, the UE 50 provided in this embodiment of the present invention may include a determining unit 51.

The determining unit 51 is configured to determine first transmission priorities of at least two pieces of data, where time-domain resources used for transmitting the at least two pieces of data overlap; and determine a target processing manner based on the first transmission priorities, where the target processing manner is used to process the at least two pieces of data.

In a possible implementation, the first transmission priorities may be target priorities, and the target priorities may include any one of the following: priorities of physical channels carrying the at least two pieces of data, priorities of data channels carrying the at least two pieces of data, priorities of transmission modes used for transmitting the at least two pieces of data, priorities of resource selection modes used for transmitting the at least two pieces of data, and priorities of RAT types used for transmitting the at least two pieces of data.

In a possible implementation, the priority of the physical channel may be a predefined physical channel priority, a physical channel priority configured by a network device, or a priority of a data channel corresponding to the physical channel.

In a possible implementation, the priority of the data channel may be a predefined data channel priority or a data channel priority configured by a network device.

In a possible implementation, the at least two pieces of data includes feedback information. A priority of a physical channel carrying the feedback information may be a predefined physical channel priority, a physical channel priority configured by a network device, a priority of a data channel corresponding to the physical channel carrying the feedback information, a highest priority in at least two pieces of service data corresponding to the feedback information, or a redefined priority corresponding to the at least two pieces of service data.

In a possible implementation, the at least two pieces of data includes feedback information. A priority of a data channel carrying the feedback information may be a predefined data channel priority, a data channel priority configured by the network device, a highest priority in at least two pieces of service data corresponding to the feedback information, or a redefined priority corresponding to the at least two pieces of service data.

In a possible implementation, the target processing manner may include any one of the following: transmitting data whose first transmission priority is greater than or equal to a preset priority in the at least two pieces of data, and discarding other data; transmitting a preset quantity of pieces of data in the at least two pieces of data and discarding other data; maintaining transmit power of data whose first transmission priority is greater than or equal to a preset priority in the at least two pieces of data, and reducing transmit power of other data; and maintaining transmit power of a preset quantity of pieces of data in the at least two pieces of data, and reducing transmit power of other data.

In a possible implementation, the first transmission priority may be predefined or configured by a network device.

In a possible implementation, the determining unit 51 is further configured to: in a case in which the at least two pieces of data all have a same first transmission priority, determine second transmission priorities of the at least two pieces of data, where the second transmission priority of each data is different. The determining unit 51 is specifically configured to determine the target processing manner based on the second transmission priorities.

Figure 6:
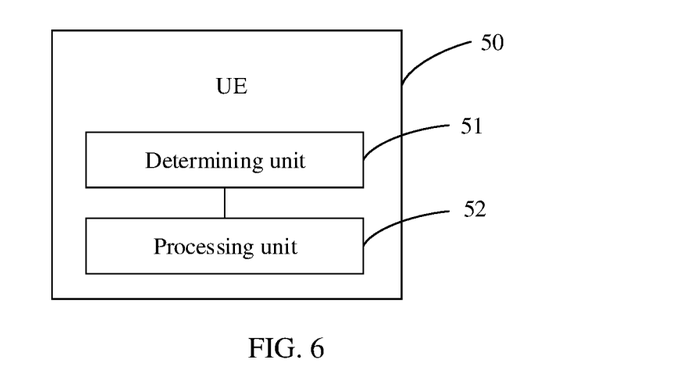
FIG. 6 is a schematic structural diagram 2 of UE according to an embodiment of the present invention.

In a possible implementation, with reference to FIG. 5, as shown in FIG. 6, the UE 50 provided in this embodiment of the present invention may further include: a processing unit 52. The processing unit 52 is configured to: after the determining unit 51 determines the target processing manner based on the first transmission priorities, process the at least two pieces of data in the target processing manner determined by the determining unit 51.

The UE provided in this embodiment of the present invention is capable of implementing various processes implemented by the UE in the foregoing method embodiment. To avoid repetition, the specific description is not repeated herein.

This embodiment of the present invention provides UE, where the UE may determine the first transmission priorities of the at least two pieces of data (the time-domain resources used for transmitting the at least two pieces of data overlap), and determine the target processing manner based on the first transmission priorities (the target processing manner is used to process the at least two pieces of data). In the sidelink transmission process, when the at least two pieces of data collide, the UE may first determine the first transmission priorities of the at least two pieces of data, and then determine, based on the first transmission priorities, the target processing manner for processing the at least two pieces of data, so that the UE can process the at least two pieces of data based on the determined target processing manner. This avoids a problem that the at least two pieces of data collide because the UE cannot transmit the at least two pieces of data simultaneously, thereby improving transmission performance of the UE.

Figure 7:
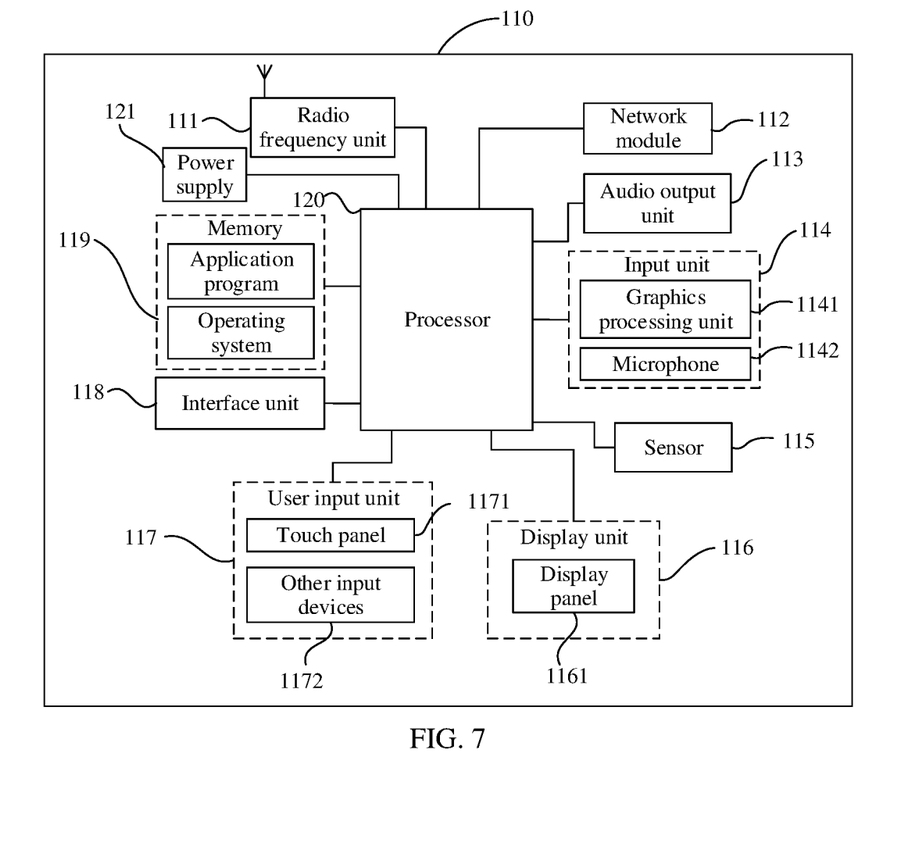
FIG. 7 is a schematic diagram of hardware of UE according to an embodiment of the present invention.

FIG. 7 is a schematic diagram of hardware of UE according to an embodiment of the present invention. As shown in FIG. 7, the UE 110 includes but is not limited to components such as a radio frequency unit 111, a network module 112, an audio output unit 113, an input unit 114, a sensor 115, a display unit 116, a user input unit 117, an interface unit 118, a memory 119, a processor 120, and a power supply 121.

It should be noted that a person skilled in the art can understand that a structure of the UE shown in FIG. 7 does not constitute any limitation on the UE, and the UE may include more or fewer components than those shown in FIG. 7, or a combination of some components, or the components disposed differently. For example, in this embodiment of the present invention, the UE includes but is not limited to a mobile phone, a tablet computer, a laptop computer, a palmtop computer, an in-vehicle terminal, a wearable device, a pedometer, and the like.

The processor 120 may be configured to determine first transmission priorities of at least two pieces of data, where time-domain resources used for transmitting the at least two pieces of data overlap; and determine a target processing manner based on the first transmission priorities, where the target processing manner is used to process the at least two pieces of data.

This embodiment of the present invention provides UE, where the UE may determine the first transmission priorities of the at least two pieces of data (the time-domain resources used for transmitting the at least two pieces of data overlap), and determine the target processing manner based on the first transmission priorities (the target processing manner is used to process the at least two pieces of data). In the sidelink transmission process, when the at least two pieces of data collide, the UE may first determine the first transmission priorities of the at least two pieces of data, and then determine, based on the first transmission priorities, the target processing manner for processing the at least two pieces of data, so that the UE can process the at least two pieces of data based on the determined target processing manner. This avoids a problem that the at least two pieces of data collide because the UE cannot transmit the at least two pieces of data simultaneously, thereby improving transmission performance of the UE.

It should be understood that in this embodiment of the present invention, the radio frequency unit 111 may be configured to: receive and transmit signals in an information receiving/sending process or a call process; and specifically, after receiving downlink data from a base station, transmit the downlink information to the processor 120 for processing, and in addition, transmit uplink data to the base station.

Generally, the radio frequency unit 111 includes but is not limited to an antenna, at least one amplifier, a transceiver, a coupler, a low noise amplifier, a duplexer, and the like. In addition, the radio frequency unit 111 may further communicate with a network and another device through a wireless communications system.

The UE provides the user with wireless broadband Internet access through the network module 112, for example, helping the user to send and receive e-mails, browse web pages, and access streaming media.

The audio output unit 113 may convert audio data received by the radio frequency unit 111 or the network module 112 or stored in the memory 119 into an audio signal and output the audio signal as a sound. In addition, the audio output unit 113 may also provide audio output (for example, a call signal reception sound or a message reception sound) related to a specific function performed by the UE 110. The audio output unit 113 includes a speaker, a buzzer, a receiver, and the like.

The input unit 114 is configured to receive an audio or video signal. The input unit 114 may include a graphics processing unit (GPU) 1141 and a microphone 1142. The graphics processing unit 1141 processes image data of a still picture or video obtained by an image capture apparatus (such as a camera) in a video capture mode or an image capture mode. A processed image frame may be displayed on the display unit 116. The image frame processed by the graphics processing unit 1141 may be stored in the memory 119 (or another storage medium) or be sent by the radio frequency unit 111 or the network module 112. The microphone 1142 is capable of receiving sounds and processing such sounds into audio data. The processed audio data can be converted into a format output that can be sent to a mobile communication base station through the radio frequency unit 111 in a telephone call mode.

The UE 110 may further include at least one sensor 115, for example, an optical sensor, a motion sensor, and another sensor. Specifically, the optical sensor may include an ambient light sensor and a proximity sensor. The ambient light sensor may adjust luminance of the display panel 1161 based on brightness of ambient light, and the proximity sensor may turn off the display panel 1161 and/or backlight when the UE 110 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the UE, functions related to vibration recognition (such as pedometer and tapping), and the like. The sensor 115 may also include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information input by the user or information provided to the user. The display unit 116 may include a display panel 1161, and the display panel 1161 may be configured in a form of a liquid crystal display (LCD), an organic light-emitting diode (OLED), or the like.

The user input unit 117 may be configured to receive input digit or character information and generate key signal input related to user setting and function control of the UE. Specifically, the user input unit 117 may include a touch panel 1171 and other input devices 1172. The touch panel 1171 is also referred to as a touchscreen and can collect a touch operation (such as an operation performed by the user on the touch panel 1171 or near the touch panel 1171 with a finger or by using any proper object or accessory such as a stylus) of the user on or near the touch panel 1171. The touch panel 1171 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and sends the touchpoint coordinates to the processor 120, and can receive a command sent by the processor 120 and execute the command. In addition, the touch panel 1171 may be implemented in a plurality of forms, for example, as a resistive, capacitive, infrared, or surface acoustic wave touch panel. In addition to the touch panel 1171, the user input unit 117 may further include other input devices 1172. Specifically, the other input devices 1172 may include but are not limited to a physical keyboard, a function key (such as a volume control key or a power on/off key), a trackball, a mouse, a joystick, and the like. Details are not described herein.

Further, the touch panel 1171 may cover the display panel 1161. When detecting a touch operation on or near the touch panel 1171, the touch panel 1171 transmits the touch operation to the processor 120 to determine a type of a touch event. Then, the processor 120 provides a corresponding visual output on the display panel 1161 based on the type of the touch event. Although in FIG. 7, the touch panel 1171 and the display panel 1161 act as two independent parts to implement input and output functions of the UE, in some embodiments, the touch panel 1171 and the display panel 1161 may be integrated to implement the input and output functions of the UE. This is not specifically limited herein.

The interface unit 118 is an interface between an external apparatus and the UE 110. For example, an external apparatus may include a wired or wireless headset port, an external power supply (or a battery charger) port, a wired or wireless data port, a memory port, a port for connecting an apparatus with an identification module, an audio input/output (I/O) port, a video I/O port, an earphone port, and the like. The interface unit 118 may be configured to receive an input (for example, data information or power) from an external apparatus and transmit the received input to one or more elements within the UE 110, or may be configured to transmit data between the UE 110 and the external apparatus.

The memory 119 may be configured to store software programs and various data. The memory 119 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 119 may include a high-speed random access memory, and may further include a non-volatile memory such as a disk storage device, a flash memory device, or another volatile solid-state storage device.

The processor 120 is a control center of the UE, and is connected to all components of the UE by using various interfaces and lines. By running or executing a software program and/or module that is stored in the memory 119 and calling data stored in the memory 119, the processor 120 executes various functions of the UE and processes data, so as to perform overall monitoring on the UE. The processor 120 may include one or more processing units. Optionally, an application processor and a modem processor may be integrated in the processor 120. The application processor primarily processes an operating system, user interfaces, application programs, and the like. The modem processor primarily processes radio communication. It can be understood that the modem processor may alternatively be not integrated in the processor 120.

The UE 110 may further include the power supply 121 (for example, a battery) supplying power to all components. Optionally, the power supply 121 may be logically connected to the processor 120 through a power management system. In this way, functions such as charge management, discharge management, and power consumption management are implemented by using the power management system.

In addition, the UE 110 includes some functional modules that are not shown. Details are not described herein.

Preferably, an embodiment of the present invention further provides UE. As shown in FIG. 7, the UE includes a processor 120, a memory 119, and a computer program stored in the memory 119 and capable of running on the processor 120. When the computer program is executed by the processor 120, processes of the foregoing method embodiment can be implemented, with a same technical effect achieved. To avoid repetition, details are not described herein again.

An embodiment of this disclosure further provides a computer-readable storage medium, where a computer program is stored in the computer-readable storage medium. When the computer program is executed by a processor 120 shown in FIG. 7, processes of the foregoing method embodiments are implemented, with a same technical effect achieved. To avoid repetition, details are not described herein again. The computer-readable storage medium is, for example, a read-only memory (ROM), a random access memory (RAM), a magnetic disk, or an optical disc.

It should be noted that the terms "include", "comprise", or any of their variants in this specification are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more restrictions, an element preceded by "includes a . . . " does not preclude the existence of other identical elements in the process, method, article, or apparatus that includes the element.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A data processing method, applied to a sidelink transmission process, wherein the method comprises:
   determining first transmission priorities of at least two pieces of data, wherein time-domain resources used for transmitting the at least two pieces of data overlap; and
   determining a target processing manner based on the first transmission priorities, wherein the target processing manner is used to process the at least two pieces of data,
   wherein the first transmission priorities are target priorities, and the target priorities comprise priorities of physical channels carrying the at least two pieces of data;
   wherein the at least two pieces of data comprises feedback information; and
   a priority of a physical channel carrying the feedback information is a priority of a data channel corresponding to the physical channel carrying the feedback information.

2. The method according to claim 1, wherein the priority of the physical channel is a predefined physical channel priority, a physical channel priority configured by a network device, or a priority of a data channel corresponding to the physical channel.

3. The method according to claim 1, wherein the priority of the data channel is a predefined data channel priority or a data channel priority configured by a network device.

4. The method according to claim 1, wherein
   the priority of the data channel carrying the feedback information is a predefined data channel priority, a data channel priority configured by a network device, a highest priority in at least two pieces of service data corresponding to the feedback information, or a redefined priority corresponding to the at least two pieces of service data.

5. The method according to claim 1, wherein the target processing manner comprises any one of the following:
   transmitting data whose first transmission priority is greater than or equal to a preset priority in the at least two pieces of data, and discarding other data;
   transmitting a preset quantity of pieces of data in the at least two pieces of data and discarding other data;
   maintaining transmit power of data whose first transmission priority is greater than or equal to a preset priority in the at least two pieces of data, and reducing transmit power of other data; and
   maintaining transmit power of a preset quantity of pieces of data in the at least two pieces of data, and reducing transmit power of other data.

6. The method according to claim 1, wherein the method further comprises:
   in a case in which the at least two pieces of data all have a same first transmission priority, determining second transmission priorities of the at least two pieces of data, wherein each data has a different second transmission priority; and
   the determining a target processing manner based on the first transmission priorities comprises:
   determining the target processing manner based on the second transmission priorities.

7. The method according to claim 1, wherein after the determining a target processing manner based on the first transmission priorities, the method further comprises:
   processing the at least two pieces of data in the target processing manner.

8. The method according to claim 1, wherein the target processing manner comprises any one of the following:
   transmitting data whose first transmission priority is greater than or equal to a preset priority in the at least two pieces of data, and discarding other data;
   transmitting a preset quantity of pieces of data in the at least two pieces of data and discarding other data;
   maintaining transmit power of data whose first transmission priority is greater than or equal to a preset priority in the at least two pieces of data, and reducing transmit power of other data; and
   maintaining transmit power of a preset quantity of pieces of data in the at least two pieces of data, and reducing transmit power of other data.

9. User equipment UE, comprising a processor, a memory, and a computer program stored in the memory and capable of running on the processor, wherein when the computer program is executed by the processor, following steps of a data processing method applied to a sidelink transmission process are implemented:
   determining first transmission priorities of at least two pieces of data, wherein time-domain resources used for transmitting the at least two pieces of data overlap; and
   determining a target processing manner based on the first transmission priorities, wherein the target processing manner is used to process the at least two pieces of data,
   wherein the first transmission priorities are target priorities, and the target priorities comprise priorities of physical channels carrying the at least two pieces of data;
   wherein the at least two pieces of data comprises feedback information; and
   a priority of a physical channel carrying the feedback information is a priority of a data channel corresponding to the physical channel carrying the feedback information.

10. The UE according to claim 9, wherein the priority of the physical channel is a predefined physical channel priority, a physical channel priority configured by a network device, or a priority of a data channel corresponding to the physical channel.

11. The UE according to claim 9, wherein the priority of the data channel is a predefined data channel priority or a data channel priority configured by a network device.

12. The UE according to claim 9, wherein
   the priority of the data channel carrying the feedback information is a predefined data channel priority, a data channel priority configured by a network device, a highest priority in at least two pieces of service data corresponding to the feedback information, or a redefined priority corresponding to the at least two pieces of service data.

13. The UE according to claim 9, wherein the target processing manner comprises any one of the following:
   transmitting data whose first transmission priority is greater than or equal to a preset priority in the at least two pieces of data, and discarding other data;
   transmitting a preset quantity of pieces of data in the at least two pieces of data and discarding other data;

maintaining transmit power of data whose first transmission priority is greater than or equal to a preset priority in the at least two pieces of data, and reducing transmit power of other data; and maintaining transmit power of a preset quantity of pieces of data in the at least two pieces of data, and reducing transmit power of other data.

14. The UE according to claim 9, wherein when the computer program is executed by the processor, following steps are further implemented:

in a case in which the at least two pieces of data all have a same first transmission priority, determining second transmission priorities of the at least two pieces of data, wherein each data has a different second transmission priority; and the determining a target processing manner based on the first transmission priorities comprises:

determining the target processing manner based on the second transmission priorities.

15. The UE according to claim 9, wherein when the computer program is executed by the processor, following steps are further implemented: after the determining a target processing manner based on the first transmission priorities, processing the at least two pieces of data in the target processing manner.

16. The UE according to claim 9, wherein the target processing manner comprises any one of the following:

transmitting data whose first transmission priority is greater than or equal to a preset priority in the at least two pieces of data, and discarding other data;

transmitting a preset quantity of pieces of data in the at least two pieces of data and discarding other data;

maintaining transmit power of data whose first transmission priority is greater than or equal to a preset priority in the at least two pieces of data, and reducing transmit power of other data; and maintaining transmit power of a preset quantity of pieces of data in the at least two pieces of data, and reducing transmit power of other data.

* * * * *